(No Model.)
C. B. WATERHOUSE.
PAD SCREW FOR HARNESS.
No. 466,389. Patented Jan. 5, 1892.
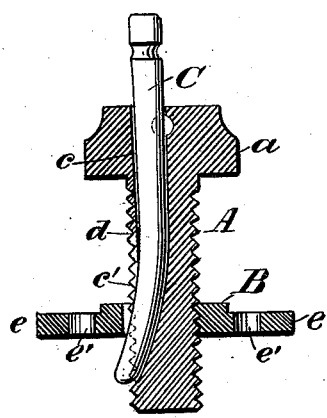
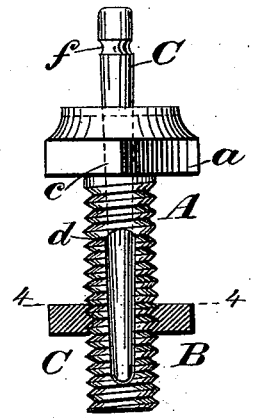
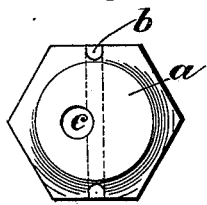
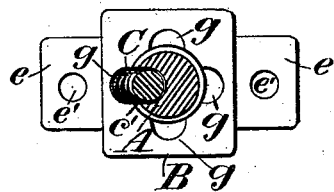
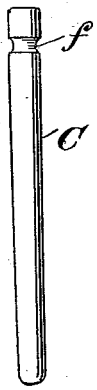
WITNESSES:
INVENTOR:
C. B. Waterhouse
BY Munn & Co.
ATTORNEYS

UNITED STATES PATENT OFFICE.

CHARLES B. WATERHOUSE, OF RISING CITY, NEBRASKA, ASSIGNOR OF ONE-HALF TO JAMES HENRY PHILPOTT, OF SAME PLACE.

PAD-SCREW FOR HARNESS.

SPECIFICATION forming part of Letters Patent No. 466,389, dated January 5, 1892.

Application filed March 6, 1891. Serial No. 383,990. (No model.)

*To all whom it may concern:*

Be it known that I, CHARLES B. WATERHOUSE, of Rising City, in the county of Butler and State of Nebraska, have invented a new and useful Improvement in Securing Harness Pad-Screws, of which the following is a full, clear, and exact description.

In my invention the pad-screw has a longitudinal perforation which extends through the screw-head, then turns outward, and vanishes on the threaded shank. A soft-metal rod or key is inserted in this perforation, and its inner end engages and locks a nut concealed within the harness-pad. This locking-key may be withdrawn when it is desired to remove the pad-screw.

Reference is to be had to the accompanying drawings, forming a part of this specification, in which similar letters of reference indicate corresponding parts in all the views.

Figure 1 is a longitudinal section of the improved pad-screw and its nut in a locked condition. Fig. 2 is a side elevation of the same, with its nut in section. Fig. 3 is a plan view of the screw with the locking-key removed. Fig. 4 is a sectional plan view of the screw and its nut in locked condition, taken on the line 4 4 in Fig. 2; and Fig. 5 is a side view of the locking-key detached.

The screw-body A is threaded to receive the nut B, which has a hexagonally-shaped head $a$ to facilitate the rotation of the screw, and in case the screw is to be used to support a terret-ring (not shown) such ring may be secured in the transverse perforations $b$ in said head. (Shown by dotted lines in Fig. 3.)

The head and body of the screw A are longitudinally perforated at $c'$ from the head nearly to the other end of the screw, as shown at $c$ in Fig. 1, said perforation swerving laterally from a point $d$ near the head $a$ out through the side of the screw, whereby an inserted key-pin C will be made to cross the thread of the screw-body—that is to say, the perforation turns gradually outward or laterally and vanishes on the threaded surface of the screw-shank.

The nut B is flanged at opposite points $e$ to afford means for securing the nut proper upon interior portions of a harness-pad, the perforations $e'$ formed in the flanges affording means for securing the nut by rivets at any point.

As shown in Fig. 4, the nut B is grooved at several points across its threaded wall which engages the screw-body A, which grooves $g$ are of a suitable form and size to adapt either of them to form a portion of a keyway, of which the longitudinal channel $c'$ in the screw is the other part, said channel being produced by the deviation of the perforation $c'$ from a straight line, as has been before mentioned.

The locking-key C is slightly tapered and made of comparatively soft metal, such as brass wire, having a groove $f$ formed around its larger end to afford a gripping-surface that will facilitate its removal, if necessary.

In adjusting the pad-screws upon the pad of a harness the nuts B are secured to an interior portion and the body of each screw inserted from the upper exterior surface of the pad, whereon the heads $a$ bear when the screws are properly adjusted. After the screws A are drawn up to retain the parts one of the grooves $g$ should be aligned with the longitudinal perforations $c$, which can be ascertained by inserting an awl or piece of wire smaller than the perforations. The key-pins C are now driven in until but a small portion projects from the head $a$ of the screw A; or if it is not necessary to remove these screws the key-pin can be cut off flush with the top of the head it penetrates.

Should it be necessary for repairs to remove the screws A, the locking-pin C, if left projected, will afford a gripping-surface for the engagement of harness-makers' pliers, whereby the pins can be quickly removed and the screws A released from locked engagement with their nuts B.

Having thus described my invention, I claim as new and desire to secure by Letters Patent—

The combination, with the pad-nut B, having internal grooves $g$, of the screw A, having a longitudinal perforation which extends through the screw-head and gradually turns laterally and vanishes on the threaded surface of the screw-shank, and the locking-key made of flexible metal and adapted for insertion in said perforation, whereby it is adapted to be forced into or withdrawn from engagement with the nut, as shown and described.

CHARLES B. WATERHOUSE.

Witnesses:
W. R. CUSHMAN,
OSCAR A. WICKERT.